United States Patent Office 3,427,580
Patented Feb. 11, 1969

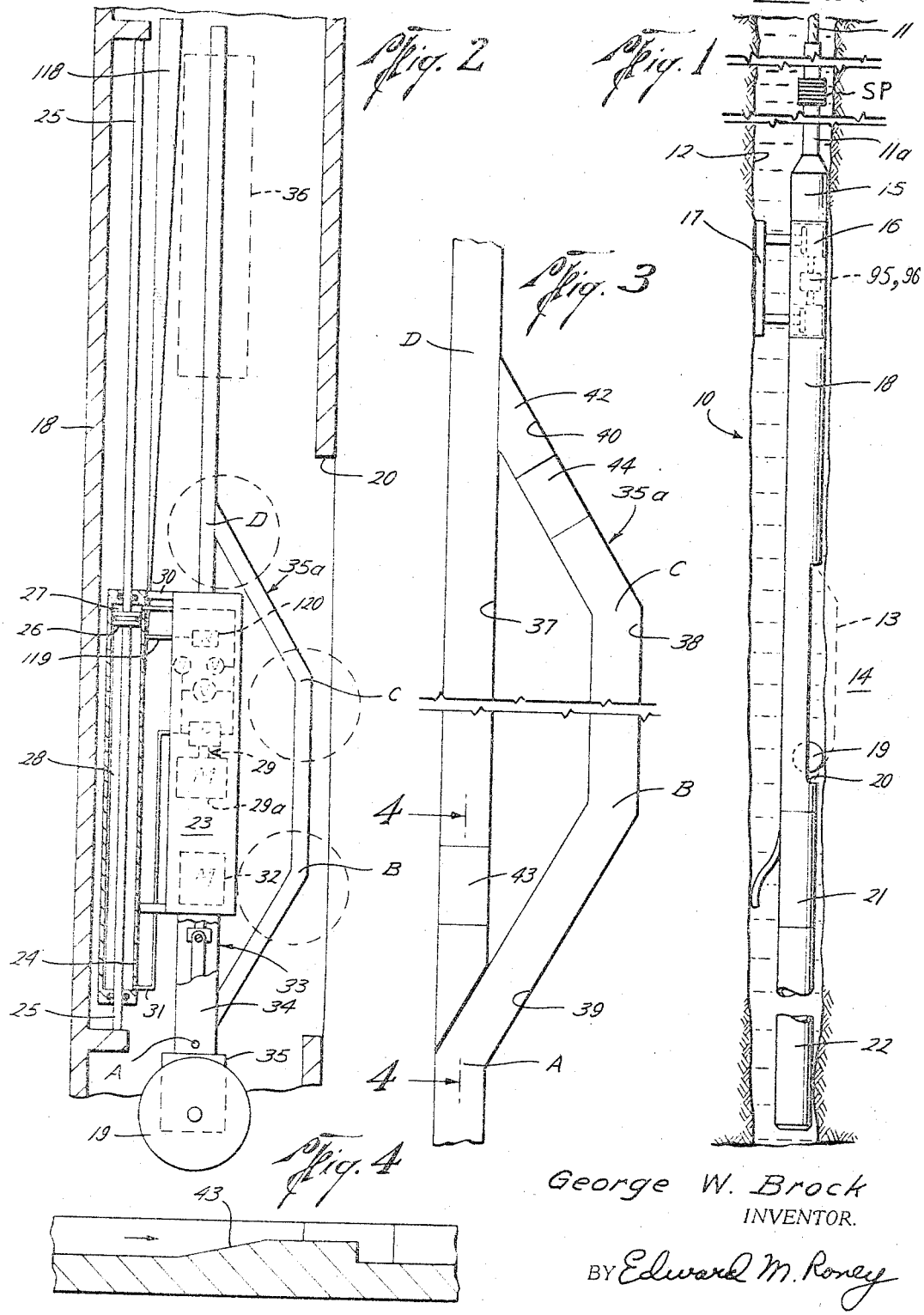

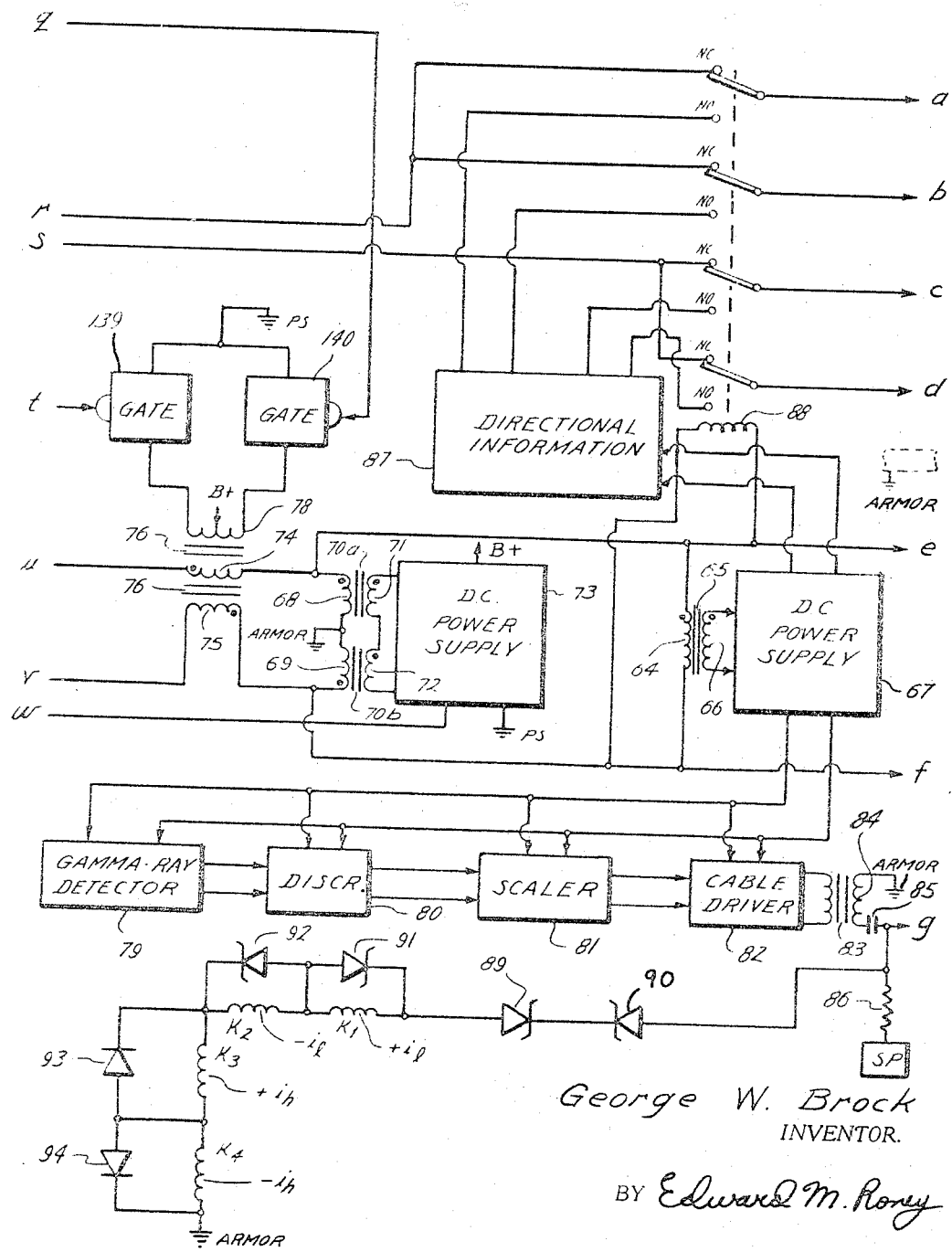

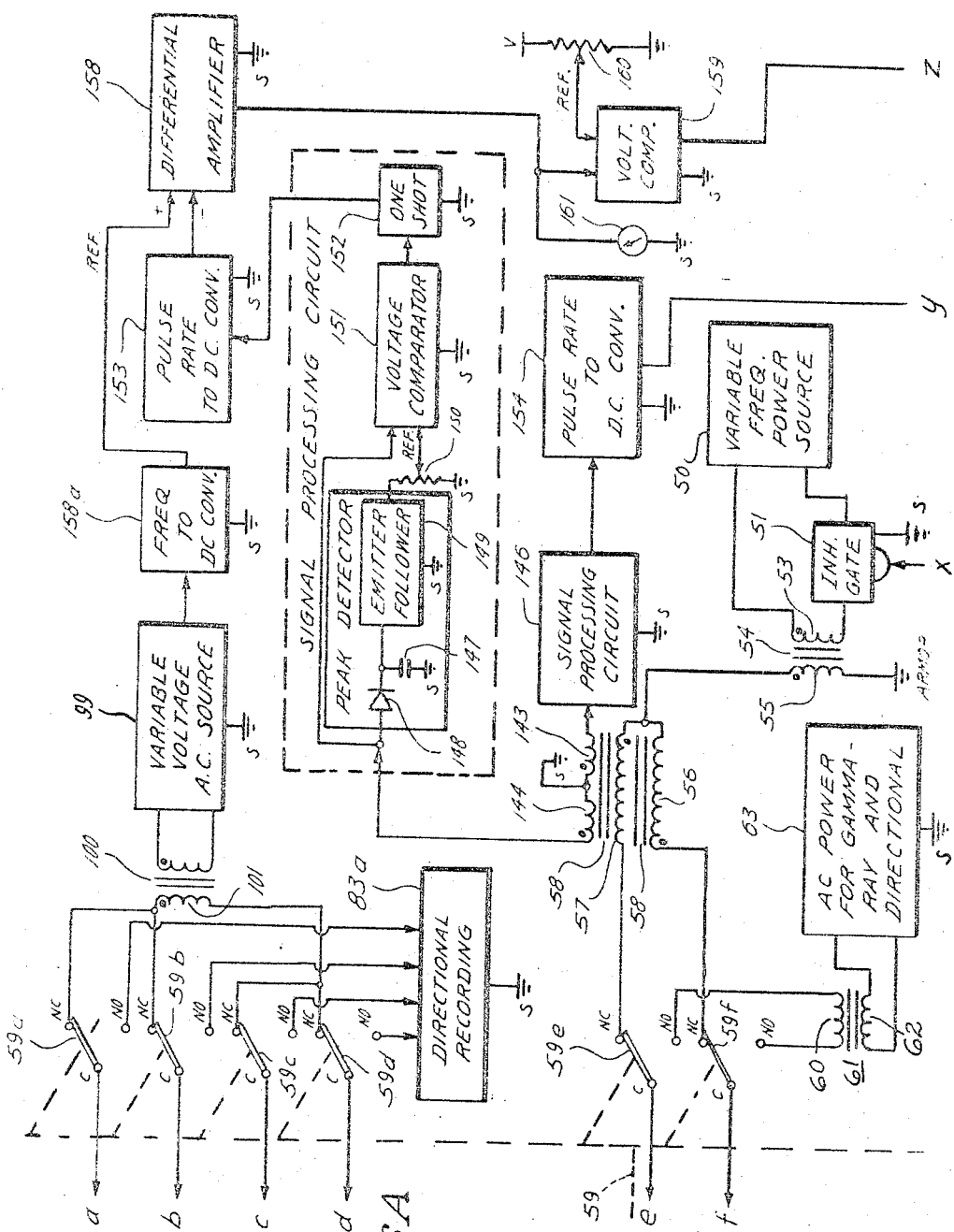

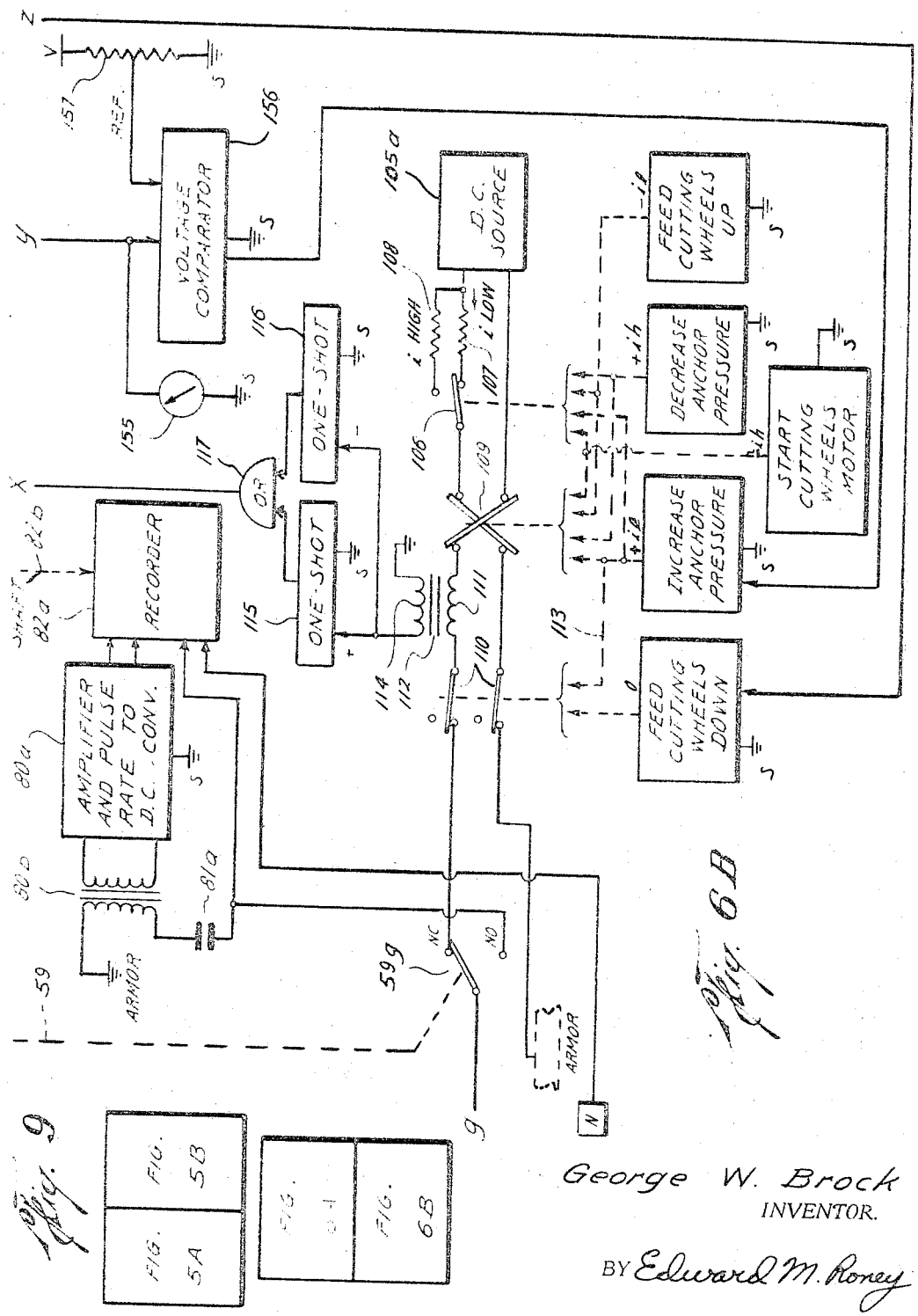

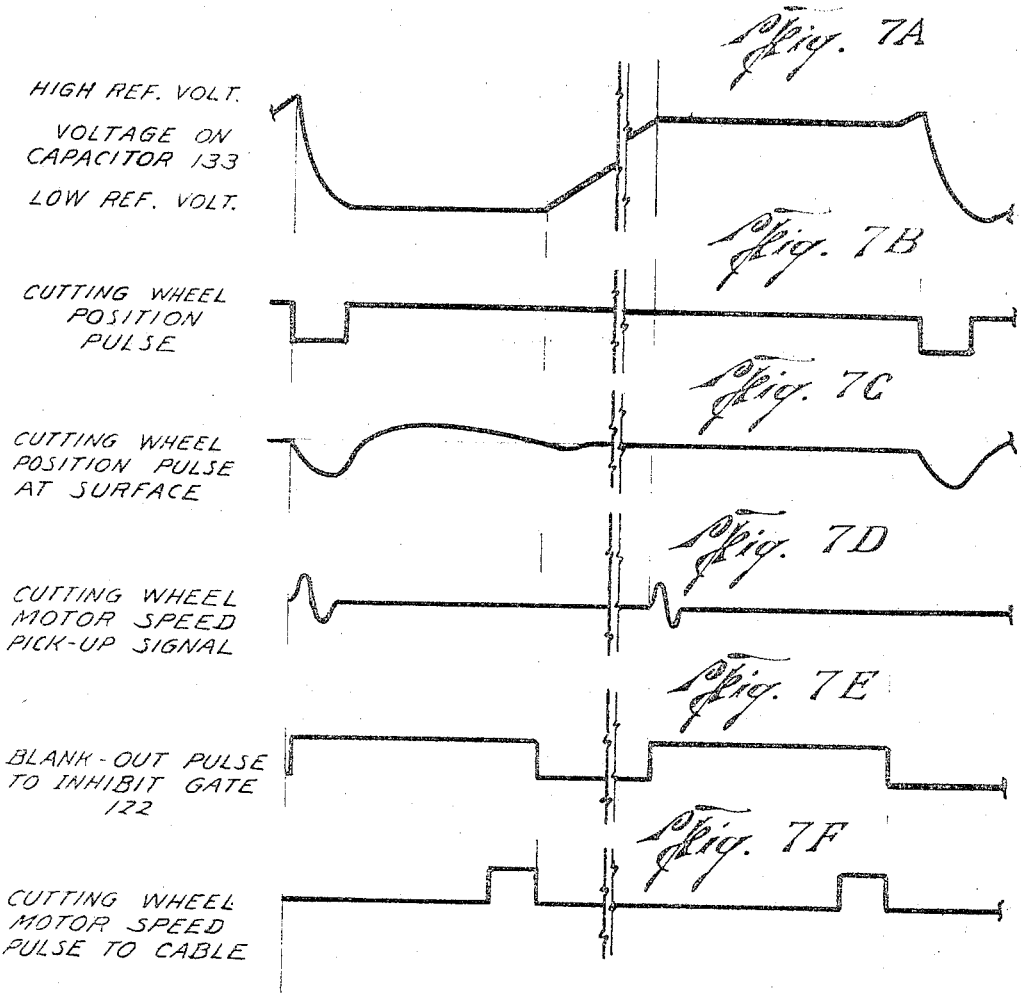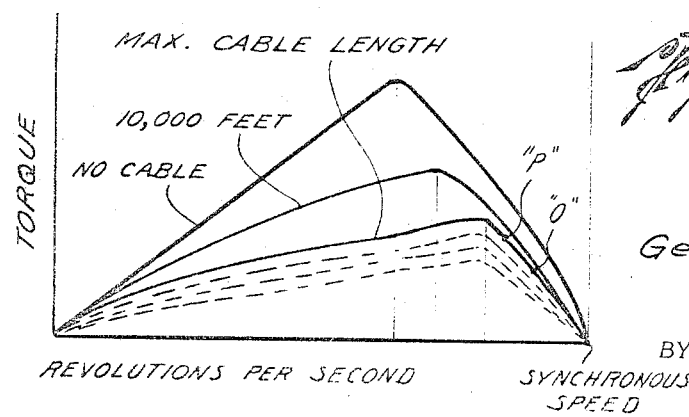

3,427,580
ELECTRICAL METHODS AND APPARATUS FOR WELL TOOLS
George W. Brock, Houston, Tex., assignor to Schlumberger Technology Corporation, Houston, Tex., a corporation of Texas
Filed June 29, 1967, Ser. No. 649,977
U.S. Cl. 340—18                                23 Claims
Int. Cl. G01v 1/40

ABSTRACT OF THE DISCLOSURE

The particular embodiment described herein as illustrative of the invention shows methods and apparatus for use with a core slicing tool in a borehole. Various circuits for monitoring and controlling the core slicing operation are disclosed, as well as circuits for deriving directional and depth control information. Means are disclosed for transmitting information from a plurality of information sources in the tool on one conductor pair. Also, automatic bias control means at the surface of the earth are shown for accurately detecting the transmitted information. Power can be selectively applied to either the core slicing circuits or the directional and depth circuits on the same conductor set by providing two different power modes. Means in the tool are responsive to one or the other power mode to switch various circuits in the tool onto various cable conductors. Also, a plurality of core slicing operations are controlled from the surface of the earth on one conductor pair by utilizing switching means responsive to a plurality of current logic states. Additionally, a method of determining the overload operating point of a motor in a tool in a borehole is disclosed.

---

The present invention pertains to electrical methods and apparatus for monitoring and controlling a tool in a borehole and more particularly, it relates to the monitoring and control of sample taking apparatus for obtaining continuous samples of earth formations along a substantial interval of the wall of a previously drilled borehole.

Heretofore, formation samples have usually been obtained from previously drilled boreholes by explosively propelling into the adjacent wall of a borehole one or more tubular bodies having appropriately arranged forward cutting edges. As these bullets penetrate the borehole wall, a generally cylindrical core of the formation material is driven into each bullet so that, when the bullets are subsequently retrieved, the cores in each will be recovered at the surface of the earth for examination. Although such core taking bullets have been highly successful, it would be desirable to obtain a continuous sample of an earth formation along a substantial vertical interval of a borehole.

One way of obtaining such continuous samples of earth formations as shown in copending application Ser. No. 649,929, filed June 29, 1967, by C. P. Lanmon. The aforementioned Lanmon copending application shows motor driven cutting wheels which are adapted to cut into the adjoining earth formations so as to slice a sample therefrom. There is also shown a suitable hydraulic pump operated by an electric motor for feeding the cutting wheels into and longitudinally upward through the formation, as well as reversing the direction of feed of the cutting wheels. In addition to this, the aforementioned Lanmon copending application includes a suitable electrical motor driven hydraulic pump anchor means for pushing the forward face of the sample taking tool against the borehole wall.

It can be appreciated that when such apparatus for performing the above-mentioned functions is in a tool which is supported in a borehole by a cable, certain electrical monitoring and control apparatus may be necessary. Among other things, it would be desirable to have suitable apparatus located in the downhole tool to ascertain the position of the downhole tool relative to the formation so that the core sample may be taken at a desired depth. It would also be desirable to know the direction of the forward face of the sample taking apparatus as well as the spatial orientation of the tool. In connection with determining the depth of the tool, the length of cable lowered into the borehole will not always give an accurate determination of absolute depth due to such factors as cable stretch. This cable stretch cannot usually be accurately determined since cable stretch is a function of such things as temperature, mud viscosity, etc. One common way of determining the proper relative depth of the downhole tool is to provide logging apparatus in the tool itself and correlate these logs with previously run logs. By so doing, the core samples can be obtained at the desired formation in the borehole.

Additionally, the motor which drives the cutting wheels must be monitored to prevent stall out caused by an excessive load, e.g., the friction on the cutting wheels becoming excessive. When it becomes apparent that the motor may stall out, it then becomes necessary to take suitable action, as by reversing the feed of the cutting wheels. One reason for this is that, should the cutting motor stall out, it may be difficult, if not impossible, to restart the motor with the cutting wheels stuck since the available starting torque is usually less than the running torque in an electrical motor. In connection with starting the cutting motor, it would be desirable to switch auxiliary capacitance into the motor windings during the starting phase to provide more starting torque.

In connection with the core slicing operation, it is desirable to have suitable circuitry for controlling the direction of the feed of the cutting wheels and to control the hydraulic anchor means. It would also be desirable, in connection with the core slicing operation, to monitor the hydraulic pump pressure for the anchor means and increase the pump pressure when necessary. In this connection, it is important to perform this function very quickly since if the core slicing tool should become deanchored, there is a chance that the sudden movement of the tool will cause the cutting wheels to bind in the earth formations that are being cut, thus stalling out the cutting motor. Again, since the output torque of an electrical motor is usually less while starting the motor, it may become very difficult or even impossible to unstick the cutting wheels in this case. For these reasons, it would be desirable to monitor the hydraulic anchor pressure so that rapid and automatic corrective action can be taken in case the pressure becomes too low.

It would be desirable also to accurately transmit information concerning some of the monitoring functions to the surface of the earth so that the operator may have sufficient information to adequately control the core slicing operation. Because of the availability of cable conductors, it would be desirable to transmit a plurality of information on one conductor pair. In this connection, it is important that the signals representative of the condition of the motor for driving the cutting wheels not be interfered with by signals representative of other conditions. On the other hand, it would be undesirable to adversely affect these signals representative of the other conditions.

It can be seen from the foregoing monitoring and control functions of the downhole tool, there are many of such functions which must be performed to perform the core slicing operation in the most desirable manner. Since cables which are available at reasonable cost in the well servicing field have a relatively small number of conductors and since cables having a large number of conductors are bulky, expensive, and generally undesirable, it would be desirable to carry out all of the abovementioned functions on multiconductor cables which are commercially available.

It is an object of the invention therefore to provide new and improved electrical methods and apparatus for use with well tools.

It is another object of the present invention to provide new and improved methods and apparatus for monitoring and controlling the operation of a tool in a borehole.

It is still another object of the present invention to provide new and improved methods and apparatus for transmitting a plurality of signals on one conductor pair from a well tool to the surface of the earth.

In accordance with the present invention, electrical methods and apparatus for well tools includes a technique for transmitting information to the surface of the earth on a conductor pair from a well tool in a borehole. First and second information sources are adapted to generate first and second information signals. In one form, first and second means are responsive to the first and second information signals for providing opposite polarity pulses for transmission to the surface of the earth. The transmission of each pulse corresponding to the first information is delayed for a given time interval after each first information signal is generated. The transmission of the second information pulses is inhibited during this delay time interval to prevent interference of the first information pulses by the second information pulses. In another form, pulses representative of a first information are supplied over the conductor pair to the surface of the earth and the repetition rate of the pulses is changed in response to the second information.

One of the techniques for generating pulses representative of information in the tool includes generating a current representative of the information and charging up a charge storage means with the current. A suitable voltage comparator means having a reference voltage applied thereto generates an output signal when the voltage of the charge storage means attains a predetermined relationship to the reference voltage. The output signal is then utilized to change the reference voltage to a new value and discharge the charge storage means until the voltage thereof discharges to the new reference value. The voltage comparator output signal, which takes the form of a pulse train, is then transmitted to the surface of the earth, the repetition rate of the pulses being representative of the input current magnitude.

In accordance with another feature of the present invention, electrical methods and apparatus for well tools includes a technique for processing pulses transmitted from a well tool. This technique includes receiving the pulses at the surface of the earth, passing only those pulses which are above a given threshold level, measuring the amplitude of the received pulses, and setting the threshold level in response to a given percentage of the measured amplitude level.

In accordance with another feature of the invention, electrical methods and apparatus for well tools includes controlling a core slicing tool in a borehole over one conductor pair from the surface of the earth by selectively energizing a plurality of switching means in the tool in response to various current logic states. The various switching means are utilized to facilitate the starting of an electrical motor for driving the cutting means of the core slicing tool, and controlling the operation of electrical motors for feeding the cutting means into the adjacent formations and anchoring the tool in the borehole.

In accordance with another feature of the present invention, electrical methods and apparatus for well tools includes apparatus for selectively applying power from the surface of the earth to circuits in the tool. To accomplish this, a set of three conductors is coupled between the tool and the surface of the earth. Power is then supplied to the tool in one mode by providing a potential difference across two of the conductors and power is supplied in a second mode by setting up an equal potential across said two conductors with the third conductor being the current return. Means are located in the tool for supplying power to a first circuit means in the tool in response to the first power mode and for supplying power to a second circuit means in the tool in response to the second power mode.

For a better understanding of the present invention, together with other and further objects, thereof reference is had to the following description taken in connection with the accompanying drawings, the scope of the invention being pointed out in the appended claims.

Referring to the drawings:

FIGURE 1 shows a core slicing tool in a borehole and in position to obtain an elongated formation sample;

FIGURE 2 is a schematic representation of the intermediate portion of the tool shown in FIGURE 1;

FIGURE 3 is a schematic representation of a groove system that may be employed with the tool shown in FIGURES 1 and 2;

FIGURE 4 is a partial cross-sectional view taken along the lines 4—4 in FIGURE 3;

FIGURES 5a and 5b show a schematic representation of the downhole electrical circuitry in a core slicing tool in accordance with the present invention;

FIGURES 6a and 6b show a schematic representation of the electrical circuitry at the surface of the earth for responding to the information transmitted from the downhole electrical circuitry of FIGURE 5 and controlling portions of the FIGURE 5 circuitry;

FIGURES 7a–7f represent voltage wave forms at selected points in the FIGURE 5 circuitry;

FIGURE 8 shows a torque versus revolution per second curve of a motor in the downhole tool for various cable lengths; and FIGURE 9 shows how FIGURE 5a fits with 5b and FIGURE 6a with 6b.

Figure 5A:
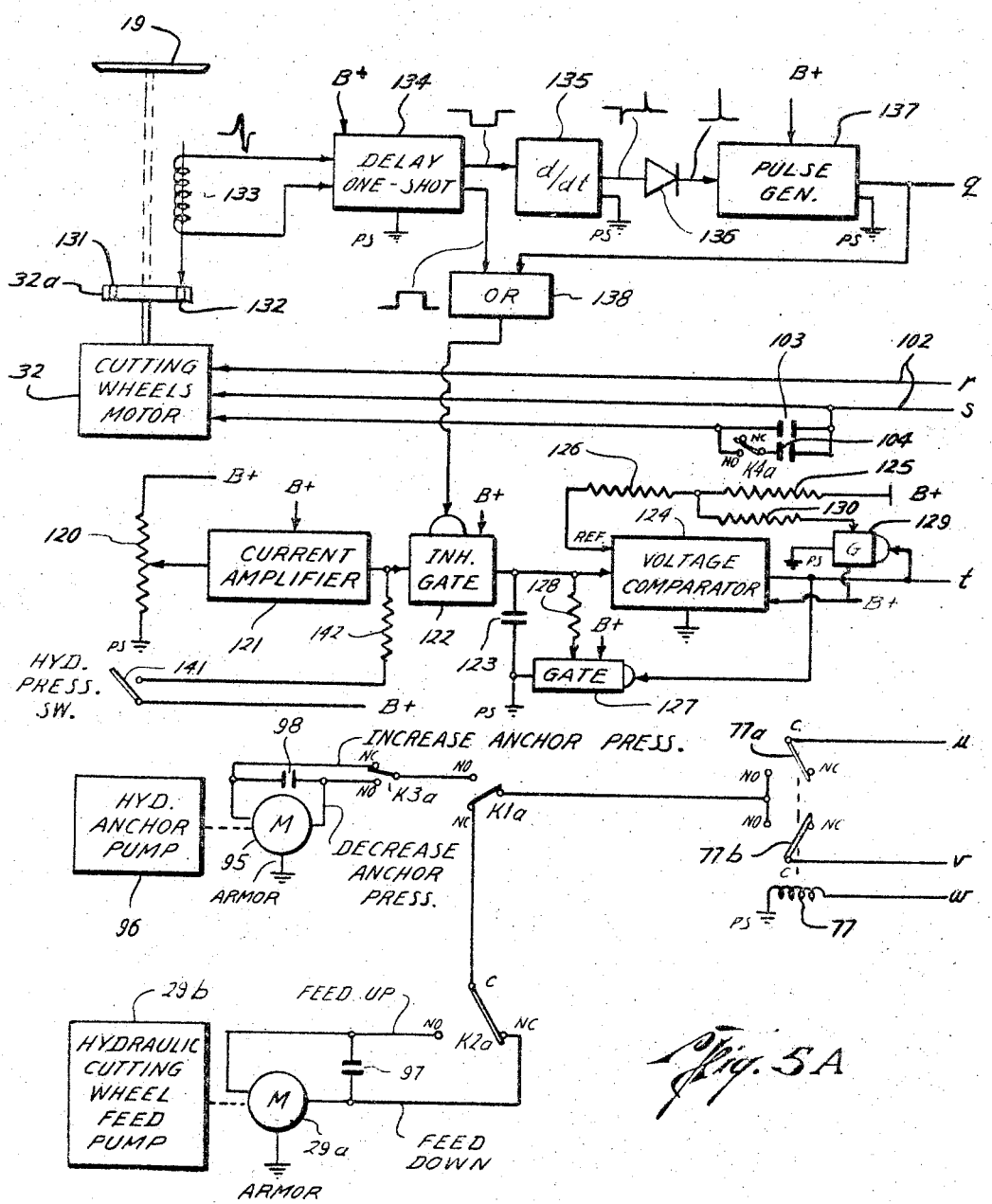

Turning now to FIGURE 1, a core slicing tool 10 arranged for use with the present invention is shown suspended from an armored multiconductor cable 11 in a borehole 12 and in position to obtain an elongated prismatic or wedge-shaped sample 13 from the adjacent wall of an earth formation 14. The lower portion of the cable 11 is covered with a suitable insulation material 11a. Located at a desired position on this insulated portion of the cable 11 is an electrode, designated SP, for measuring the naturally occurring or spontaneous formation potential. This SP electrode is connected to a suitable conductor in the cable 12 to provide an indication of this naturally occurring potential at the surface of the earth. Copending applications 649,929 by C. P. Lanmon, 649,976 by H. Urbanosky, and 649,952 by E. F. Brieger, filed simultaneously herewith more fully described those portions of the tool 10 that are not a part of the present invention.

In general the upper housing 15 of the tool 10 preferably encloses typical circuitry for locating the tool at a desired position in the borehole 12 as well as the circuitry of the present invention for controlling the various components in the tool and transmitting information and power through the various conductors in the suspension cable 11. The next lower housing 16 preferably includes a hydraulically actuated wall-engaging anchor means 17 that is selectively extendible against one side of the borehole 12 to shift the forward face of the core slicing tool 10 in the opposite direction and thus anchor the tool 10.

The intermediate housing 18 of the tool 10 supports a pair of similar cutting wheels 19 that are respectively mounted in converging vertical planes and arranged to rotate about independent, outwardly diverging axes themselves lying generally in the same horizontal plane and intersecting each other at a suitable angle. The cutting wheels 19 are suitably arranged and sized in relation to one another so that their peripheral edges will all but come together at about the point of intersection of the three aforementioned planes. Thus, by moving the wheels 19 in unison in a generally vertical direction, the generally wedge-shaped or triangular prismatic sample 13 will be cut from the adjacent formation 14.

To gain entrance for the cutting wheels 19 into the formation 14, the wheels are advanced outwardly and upwardly through a longitudinal opening 20 in the housing and to their outermost lateral position. Then, after a longitudinal cut of a predetermined length has been made, the cutting wheels 19 are returned along an upwardly inclined path and back through the housing opening 20 until they are fully retracted. The cutting wheels 19 then return to their original starting position while still fully retracted.

Motion-translating means (not shown) are arranged in the housing 21 coupled immediately below the intermediate tool housing 18 and operated by the travel of the cutting wheels 18 to rotate a sample receiver in the housing 22 therebelow into position to receive successive formation samples, as at 13, as they are freed by the cutting wheels and to segregate these samples from one another. Since a complete description of the motion-translating means and sample receiver is not essential to a full understanding of the present invention, suffice it to say that the sample receiver is basically comprised of a plurality of upright tubes (not shown) that are successively rotated (by the motion-translating means) about the longitudinal axis of the housing 22 into position to receive one of the formation samples 13. The upper ends of these sample-receiving tubes are of course, open and their lower ends are closed. For further details, a complete description of the motion-translating means and the sample receiver is found in the aforementioned copending Urbanosky application Ser. No. 649,976.

Turning now to FIGURE 2, a schematic representation is shown of the intermediate housing 18 of the tool 10 in which the cutting wheels 19 are confined. In general, the cutting wheels 19 are operatively mounted below an enclosed housing or enclosure 23 that is in turn secured to two parallel tubular members 24 (only one seen in FIGURE 2). These tubular members 24 are each slidably disposed about substantially longer, paralleled longitudinal rods 25 (only one seen in FIGURE 2) that are secured only at their upper and lower ends to the tool housing 18 and spaced away from the rear wall of the housing. The opposite ends of the tubular members are slidably sealed around the elongated rods 25. A piston member 26 (only one shown in FIGURE 2) is fixed at an intermediate position on each of the elongated rods 25 and slidably sealed relative to the internal bore of its associated tubular member 24 to define therein separate upper and lower fluid-tight chambers 27 and 28.

Accordingly, it will be appreciated that by developing a higher fluid pressure in the upper hydraulic chambers 27 than that in the lower hydraulic chambers 28, the tubular members 24 and enclosure 28 connected thereto will be moved upwardly along the elongated rods 25 relative to the tool housing 18. Similarly, by imposing a higher pressure in the lower hydraulic chambers 28 than that in the upper hydraulic chambers 27, the enclosure 23 will travel downwardly along the rods 25.

To develop such higher pressures in the chambers 27 and 28, a suitable motor driven hydraulic pump 29 is mounted within the enclosure 28 and connected by fluid lines 30 and 31 to the hydraulic chambers. The pump 29 can be selectively operated from the surface to transfer fluid between the hydraulic chambers to accomplish the desired travel of the enclosure 23 along the elongated rods 25. The hydraulic means for anchoring the tool uses this same type of arrangement (not shown for brevity). To power the cutting wheels 19, a suitable induction motor 32 is also fitted into the enclosure 23 and connected to the cutting wheels by suitable power transmission means 33.

A pair of depending arms 34 (only one shown in FIGURE 2) are connected at their lower ends to a right-angle gear drive 35 supporting the cutting wheels 19, with these arms being pivotally connected at their upper ends to the enclosure 23. Outwardly biased guide pins (not shown in FIGURE 2) near the free ends of the pivoted arms 34 are slidably disposed in a labyrinth-like system of grooves 35a (only one system seen in FIGURE 2) formed in the interior side walls of the intermediate housing 18 on opposite sides of the longitudinal opening 20 therein. These groove systems 35 are so arranged that upward longitudinal travel of the enclosure 23 from its full-line position to its dashed-line position at 36 in FIGURE 2 will be effective (through the co-action of the guide pins in their respective groove system) to direct the cutting wheels 19 along the path A–B–C–D depicted in FIGURES 2 and 3. Then, upon downward travel of the enclosure 23 back to the full-line position shown in FIGURE 2, the groove systems 35 and their guides will direct the cutting wheels 19 downward toward their initial position at A.

As seen in FIGURE 3, the groove systems 35 are arranged in a closed loop having two parallel longitudinal positions 37 and 38 of unequal length and spaced apart from one another. The shorter grooves 38 are connected at their opposite ends to the longer grooves 37 by oppositely directed inclined groves 39 and 40 which respectively intersect the longer grooves at longitudinally spaced intermediate points.

Accordingly, as the cutting wheels 19 move along the path A–B, they will be moving upwardly and outwardly as they cut their way into the formation 14. Then, as the cutting wheels 19 move upwardly from their position at B to their position at C, they will be cutting along a straight path of a length determined by the length of the shorter grooves 38. Upon reaching their position at C, the cutting wheels 19 will be retracted as they move further upwardly and cut their way toward their position at D. Thus, once the cutting wheels 19 have reached the position at D, a prismatic sample 13 with tapered ends will have been cut out of the formation 14 and will drop into the core receiving housing 22 therebelow.

The groove systems 35 must, of course, be arranged to insure that their respective guide pins are diverted into the lower inclined grooves 39 as the enclosure 23 moves upwardly. Similarly, when the enclosure 23 has reached its uppermost position (as at 36 in FIGURE 2), the guide pins must be prevented from re-entering the upper grooves 40 so that the cutting wheels 19 can proceed from their position at D to their position at E and back to their initial position at A.

Accordingly, as seen in FIGURES 3 and 4, an abutment 41 is provided in the lower end of each of the longer grooves 37 for preventing the guide pins from entering the longer grooves as they move upwardly. To facilitate the passage of the guide pins, the faces of the abutments 41 are extended along the line of the downwardly facing wall of the lower inclined grooves 39 as shown in FIGURE 3. Similarly, to insure that the guide pins will not reenter the upper end of the upper inclined grooves 40 as the enclosure 23 is returned downwardly, an abutment 42 (similar to that at 41) is located across the entrance to the upper end of each of the upper inclined grooves 40. Hereagain, to facilitate the passage of the guide pins, the faces of the abutments 42 are made as a continuation of the right-hand (as viewed in FIGURE 3) side walls of the longer grooves 37. The height of each abutment, as at 41, is made less than the total depth of its associated groove 37 and inclined ramp or surface, as at 43 (FIGURE 4), is provided from the bottom of the groove 37 up to the upper surface of the abutment, with this inclined surface rising in the direction from which the guide pin in that groove is intended to be coming. Thus, as the spring-biased guide pins reach their positions they can retract sufficiently to move up the inclined surfaces 43 of the abutments 41 as the enclosure 23 is moved downwardly. Once the guides reach the abrupt faces of the abutments, they will be urged outwardly and return to their normal extended position. The inclined surfaces 44 (FIGURE 3) on the lower ends of the upper abutments 42 in the slots 38 will, of course, function in the same manner.

Referring now to FIGURES 5a and 5b, there is shown the downhole electrical circuitry of the present invention which has two basic functions. One is to obtain directional information such as the azimuth, relative bearing and inclination of the tool in the borehole as well as running a log of certain characteristics of the adjoining earth formations for depth control purposes. The second function of the downhole circuitry is to monitor and control the core slicing operation, including the anchoring of the tool in the borehole, and supply certain information to the surface of the earth.

For the directional information and depth control, there must be a sufficient number of conductors to supply the azimuth, relative bearing, and inclination information, as well as the depth control logging information to the surface of the earth. It is also necessary to derive power from the surface of the earth to operate the directional information and depth control equipment in the tool 10. Concerning the functions utilized in connection with the core slicing operation, FIGURES 5a and 5b also includes circuitry for monitoring the revolutions per second of the motor driving the cutting wheels 19, circuitry for measuring the position of the cutting wheels 19 along its elongated path and for cutting the formation material, as well as circuitry for monitoring the hydraulic pressure of the hydraulic anchor means. The FIGURES 5a and 5b apparatus, in connection with the core slicing operation, also includes circuitry for selectively energizing switching means for starting the cutting motor 32, applying hydraulic pressure in the proper chamber (upper or lower) to anchor or release the tool, and applying hydraulic pressure in the proper chamber 27 or 28 for moving the cutting wheels up or down.

Before proceeding with the discussion of FIGURES 5a, 5b, 6a and 6b, refer to FIGURE 9 to see how they fit together. The letters q through z correspond to the conductor which pass from FIGURES 5a to 5b and 6a to 6b. Hereinafter, FIGURES 5a and 5b will be referred to simply as FIGURE 5 and FIGURES 6a and 6b simply as FIGURE 6.

Referring now to FIGURE 6, the apparatus at the surface of the earth for supplying power to the apparatus utilized in connection with the core slicing operation comprises a variable frequency power source 50 which supplies current through an inhibit gate 51 to the primary winding 53 of a transformer 54. The current developed in the secondary winding 55 of the transformer 54 is supplied between the armor of the cable 11 and through the primary windings 56 and 57 of a transformer 58 to the normally closed contacts of a pair of switches 59e and 59f of a plurality of ganged switches 59. The common contacts of switches 59e and 59f are connected to the conductors e and f of the multiconductor cable 11. When the switches 59e and 59f are switched to their normally open contacts, the conductors e and f are connected across the secondary winding 60 of a transformer 61. The primary winding 62 of transformer 61 is connected to a suitable AC power source 63.

It can be seen that when the switches 59e and 59f are in their normally closed positions, the variable frequency power source 50 develops a voltage across the secondary winding 55 of transformer 54 which causes in-phase voltages to be set up on conductors e and f. On the other hand, when the switches are in the normally open position, the AC power supply 63 causes out of phase voltages or a potential difference to be set up across the cable conductors e and f.

Now referring to FIGURE 5, the primary winding 64 of a transformer 65 is connected across the cable conductor e and f in the tool. The secondary winding 66 of transformer 65 is connected to the input of a DC power supply 67. Thus, DC power supply 67 will only be energized when conductors e and f have out of phase voltages, i.e., only when switches 59e and 59f (FIGURE 6) are in the normally open positions coupling AC power supply 63 to conductors e and f. Also connected across the cable conductors e and f in series relationship, are a pair of oppositely phased primary windings 68 and 69 of transformers 70a and 70b respectively. The intermediate point between the primary windings 68 and 69 is connected to the armor of the multiconductor cable 11. A pair of identically phased secondary windings 71 and 72 of transformers 70a and 70b respectively are connected in series and supplied to the input of a DC power supply 73.

It can be seen that these windings of transformers 70a and 70b are wound or phased (shown by the dots) so that DC power supply 73 will be energized only when in-phase voltages are applied to cable conductors e and f with the current return through armor, i.e., when switches 59e and 59f, FIGURE 6) are in the normally closed position coupling power supply 50 to cable conductors e and f. When energized, the power supply 73 provides a DC supply voltage designated B+ to the core slicing circuits. The ground for power supply 73 is designed PS in FIGURE 5. This B+ voltage is shown at various points in the FIGURE 5 circuit.

The cable conductor e is also connected in series fashion through the secondary windings 74 of a transformer 76 and to the common contact of a switch 77a. The cable conductor f is also connected through the secondary winding 75 of transformer 76 to the common contact of a switch 77b. Switches 77a and 77b are energized by a relay solenoid 77 which is energized when DC power supply 73 is energized. The normally open contacts of switches 77a and 77b are connected together and to the common contact of a relay operated switch K1a to supply power for various core slicing functions to be described later. The transformer 76 is utilized to couple pulses indicative of various core slicing operations via the primary winding 78 to the cable conductors e and f for transmission to the surface of the earth. The secondary windings 74 and 75 of transformer 76 are phased in opposite directions as shown by the dots, so that the power supplied therethrough to the various core slicing functions (via switches 72a and 72b) will not induce a voltage in the primary winding 78, but yet a current supplied to the primary winding 78 will induce a series-aiding current in the secondary windings 74 and 75.

Thus, in operation, when switches 59e and 59f are in the normally open position thus providing out of phase voltages across conductors e and f from power supply 63, DC power supply 67 will become energized and supply DC power for the depth control and directional information apparatus in the tool. This out of phase voltage will not energize DC power supply 73 because of the phasing of transformer 70a and 70b and will not induce a voltage in the primary winding 78 of transformer 76 since relay 77 is only energized when DC power supply 73 is energized. On the other hand, when switches 79e and 79f are placed in the normally closed positions, AC power supply 50 supplies an in-phase voltage on cable conductors e and f with the armor being the current return. In this mode, only DC power supply 73 is energized and relay solenoid 77 is energized, thus closing switches 77a and 77b. By utilizing two conductors and armor for this dual mode power supply system, the impedance seen by the power supplies at the surface of the earth is relatively low, thus providing efficient operation of the power distribution system, particularly by providing good impedance matching.

Now concerning the downhole circuitry for providing depth control and directional information to the surface of the earth, the depth control desirably takes the form of gamma ray and spontaneous potential measurements. To provide the gamma ray log, a standard gamma ray scintillation detector 79 supplies pulses representative of the measured natural gamma rays to a suitable amplitude discriminator 86 which passes only those pulses having a voltage amplitude above a certain level. The pulse output from discriminator 80 is supplied to a suitable scaler or frequency divider 81, which comprises one or more flip-flops, whose output is supplied to a suitable cable driver 82 which could comprise, for example, a blocking oscillator. The pulse output from cable driver 82 is coupled through a transformer 83, whose secondary winding 84 is connected between the armor of cable 11 and a cable conductor g through a capacitor 85. Also tied to cable conductor g is the SP electrode of FIGURE 1 through a suitable resistor 86. The capacitor 85 acts to block the SP current from shorting out through secondary winding 84 to armor and resistor 86 tends to keep the SP electrode from loading down the other circuitry tied to cable conductor g. Thus, it can be seen that the depth control information, comprising pulses representative of naturally occurring gamma rays from the earth formations and the SP current (which is a varying DC signal) are supplied to the surface of the earth via cable conductor g. The potential reference electrode for the spontaneous potential measuring circuit is the electrode N at the surface of the earth. The gamma ray pulses are referenced to the armor (see FIGURE 6). Obviously, since the gamma ray detector and SP electrode are not on depth with the core slicing cutting wheels (see FIGURE 1), some depth shifting of SP and gamma ray will be necessary.

The directional information apparatus comprises equipment for measuring the azimuth, relative bearing, and inclination of the tool 10 in the borehole. This is represented by the box 87 designated "directional information." This apparatus can comprise for example the apparatus shown in U.S. Patent No. 2,746,162 granted to M. F. B. Picard on May 22, 1956. The DC power for the directional information apparatus 87 is derived from DC power supply 67. The output signals from the directional information apparatus are in the form of varying DC. signals proprotional to the desired information. To facilitate the transmission of this directional information to the surface of the earth, a suitable relay solenoid 88 is connected across the cable conductors e and f. Therefore, when the power on cable conductors e and f is in the depth control and directional mode, i.e. (out of phase) to energize DC power supply 67, relay solenoid 88 will become energized. This switches the output conductors from the directional information circuitry 87 (which are connected to the normally open contacts of the switches controlled by relay solenoid 88) to a plurality of cable conductors a, b, c and d, which are connected to the common contacts thereof. One of the cable conductors a, b, c or d is utilized as a return conductor, the other three cable conductors carrying the azimuth, relative bearing and inclination information.

Referring back to the surface equipment of FIGURE 6, when the depth and directional information is being measured, the ganged switches 59 are in the normally open position. Thus, the gamma ray pulses between conductor g and the armor, are supplied to an amplifier and pulse rate to DC converter 80a via a transformer 80b. A blocking capacitor 81a is placed in series with the primary winding 80c of transformer 80b to keep this primary winding 80C from loading down the SP circuit. The DC output signal from pulse rate to DC converter 80a is recorded by a suitable recorder 82a driven by a shaft 82b as a function tool depth. Recorder 82a also records the SP potential developed across the SP electrode and potential reference electrode N, the normally open contact of switch 59g being connected to the recorder 82a for this purpose. The mechanical damping of recorder 82a (i.e., the galvanometer pen) acts as a low-pass filter to prevent the high frequency gamma ray pulses from interfering with the SP recording. To record the directional information, the normally open contacts of switches 59a, 59b, 59c and 59d are supplied to a suitable recorder 83a.

Now concerning how the various core slicing operations are controlled from the surface of the earth, there are shown in FIGURE 5 a plurality of relay solenoids K1, K2, K3 and K4 in series relationship connected across the cable conductor g and armor. Also in series with these relay solenoids are a pair of back-to-back Zener diodes 89 and 90 for keeping the relay solenoids K1–K4 from loading down the SP measure circuit, i.e., the Zener breakdown voltage of Zener diodes 89 and 90 will be greater than the greatest expected spontaneous potential. Relay solenoids K1 and K2 have Zener diodes 91 and 92 respectively shunted therewith and relay solenoids K3, K4 have diodes 93 and 94 respectively shunted therewith. Considering cable conductor g as positive, diodes 91 and 93 are back-biased and diodes 92 and 94 are forward-biased.

The relay contact K1a associated with relay solenoid K1 has its normally closed contact connected to the common contact of a switch K2a which is energized by relay solenoid K2. The normally closed contact of switch K2a is connected to one input of the motor 29a for operating the hydraulic cutting wheel feed pump. (See FIGURE 2.) The normally open contact of switch K2a is supplied to the other input of the motor 29a. The power for the motor 29a is returned through the armor. The normally open contact of switch K1a is connected to the common contact of a switch K3a which is energized by the relay solenoid K3. The normally closed contact of switch K3a is supplied to one input of a motor 95 which controls a hydraulic anchor pump 96 to move the anchor means 17 (FIGURE 1.) The normally open contact of switch K3a is supplied to the other input of motor 95, the current from the motor 95 being returned through armor.

Now concerning the relay logic associated with relays K1, K2, K3 and K4, these relay solenoids are selected such that the current required to energize solenoids K3 and K4 is much greater than that required to energize solenoids K1 and K2. Now, if a positive voltage is applied to cable conductor g, (positive is considered to be cable conductor g positive with respect to armor), it can be seen that diodes 92 and 94 will short out relay solenoids K2 and K4. On the other hand, if a negative voltage is applied to cable conductor g, diodes 91 and 93 will short out solenoids K1 and K3. Thus, by supplying a small positive current on conductor g, only relay solenoid K1 will be energized. On the other hand when a large positive current is supplied to the relay solenoids K1–K4, relay solenoids K1 and K3 will both be energized. It can be seen that the same type of things will occur when the polarity is reversed, that is a small negative current will energize relay solenoid K2 only and a large negative current will energize both solenoids K2 and K4. The Zener diodes 91 and 92 across relay solenoids K1 and K2 serve to protect their respective relay solenoids from pulling too much current during the large current logic states. In addition to these four current logic states, there is another current logic state, namely, zero current.

Now looking at the relay contacts associated with relay solenoids K1–K4, the zero current logic state causes the motor 29 to operate in the mode to feed the cutting wheels 19 down by pumping hydraulic fluid into the lower chamber 28 of tubular member 24 (FIGURE 2). In the negative low current logic state (K2 energized), the cutting wheels 19 are fed up by reversing the motor 29a direction and feeding hydraulic pressure into upper chamber 27 of tubular member 24. A capacitor 97 connected across the inputs to motor 29a provides the necessary phase change to cause the reversal in direction of motor 29a. When a positive low current is supplied to the relay solenoids thus energizing relay solenoid K1, the relay switch K1a switches to the normally open position thus supplying power to the hydraulic anchor motor 95 in a phase which will cause the hydraulic anchor pressure to increase. The anchoring means can be a differential pressure operated piston arrangement like the one discussed earlier to feed the cutting wheels 19 up and down. Thus, when speaking of increasing hydraulic anchor pressure, this means that the wall-engaging anchor member 17 (see FIGURE 1) is pushed outward to engage the borehole wall, and when decreased it is retracted. When a positive high current is supplied to the relay solenoids, thus energizing relay solenoids K1 and K3, it can be seen that power will be supplied in the opposite phase to motor 95 thus causing hydraulic anchor pressure to decrease. A capacitor 98 connected across the input leads to motor 95 provides the necessary phase reversal.

Now, concerning the power supply circuit to cutting wheel motor 32, referring to FIGURE 6, the power for the motor 32 is derived from a variable voltage AC power source 99, desirably 60 cycles, which supplies the power via a transformer 100 to the cable. Each side of the secondary winding 101 of transformer 100 is split into two conductors which are each individually connected to the normally closed contact of switches 59a, 59b, 59c and 59d. The common contacts of these switches are connected to cable conductors a, b, c and d. Referring to FIGURE 5, at the tool, these cable conductors a, b, c and d are connected to the common contacts of the switches energized by relay solenoid 88. (During the core slicing operation, relay solenoid 88 is de-energized). The normally closed contacts of these switches are recombined into two sepaarte conductors 102, corresponding to the two conductors from transformer 100 (FIGURE 6) and supplied to the motor 32. The third input to motor 32 is supplied from one of the conductors 102 through a "running" capacitor 103 to provide the polyphase operation during normal running operation. A "starting" capacitor 104 in series with a normally open switch K4a energized by relay solenoid K4 is shunted with "running" capacitor to provide more capacitance, and thus more starting torque, for starting the motor. Thus, the negative high current logic state which energizes relay solenoid K4, is for starting the cutting wheel motor 32.

Referring to FIGURE 6, there is shown the circuitry at the surface of the earth for providing the various current states for the relay solenoids K1–K4. A suitable DC voltage source 105a provides current for the various logic states. The high and low current states are provided by a switch 106 switching between either a high value resistor 107 to provide a low current or a low value resistor 108 to provide a high value of current. To provide the positive and negative polarity states, a suitable polarity reversing switch 109 is provided, whose output contacts are supplied through a pair of switches 110 to cable conductor g and armor. The connection to cable conductor g is supplied through a switch 59g of ganged switches 59 (the normally closed contact thereof). The primary winding 111 of a transformer 112 is inserted in the conductor between the polarity reversing switch 109 and one of the switches 110.

In FIGURE 6, there are shown the various core slicing functions, i.e. "feed cutting wheels down," "increase anchor pressure," "start cutting wheels motor," "release anchor," and "feed cutting wheels up." Each of these functions are coupled in a desired manner to the switches 106, 109 and 110 for providing the various current logic states to the downhole relay solenoids K1–K4. The "feed cutting wheels down" function requires a zero current level on the cable conductor g and thus the switches 110 are open for this function. For the remainder of the functions, switches 110 are closed. For the "increase anchor pressure" function which required a low positive current, the switch 106 is placed in the low current position and polarity reversing switch 109 is placed in the positive polarity position. The remaining functions operate in a similar manner on the switches 106 and 109 to provide the desired current logic states.

It is recognized that various logic combinations of these functions can be utilized to bring about desired results. For example, it is most important that should the hydraulic anchor pressure be decreasing, thus indicating that the tool may begin slipping, the "increase anchor pressure" function should override all of the other core slicing operations. Thus, the dotted line 113 is shown to provide override of the "feed cutting wheels down" function (zero current), from the "increase anchor pressure" function. (Obviously, switches 110 must be closed to operate any other current logic state). Perhaps the second most important consideration is the possible stall out of the cutting wheel motor 32, again to prevent the cutting wheels from becoming stuck in the formation. Thus, when it is determined that the cutting wheels motor 32 may stall out, the "feed cutting wheels down" function is energized, but only if the "increase anchor pressure" function is not energized. It can be seen that various logic combinations of the core slicing functions can be utilized, as desired, depending on the relative importance of each function. While these particular surface logic functions were not explicitly shown, it can be appreciated that one of ordinary skill in the art can arrange suitable logic elements, such as relays, to achieve the desired results.

Whenever the downhole relay solenoids K1–K4 are energized from the surface, it may be undesirable to have the relay contacts of these relay solenoids interrupt a large amount of current to prevent burn out of the relay contacts. To alleviate this problem, whenever there is a change in current to the relay solenoids K1–K4 downhole, a voltage is induced in the secondary winding 114 of transformer 112 by this change in current. The secondary winding 114 is connected in parallel to a pair of one-shots 115 and 116 which are responsive to positive and negative voltage excursions respectively. The outputs of one-shots 115 and 116 are connected through an OR gate 117 to the control input of the inhibit gate 51, which momentarily removes power from the cable conductors e and f. The on-time of one-shots 115 and 116 are set such that power will be reapplied to cable conductors e and f shortly after the downhole relay contacts have had a change to switch.

Now concerning the downhole circuitry for monitoring the core slicing operation, first referring to FIGURE 2, there is shown a suitable ramp device 118 whose axis is arranged parallel to the elongated rods 25 but whose surface nearest the enclosure 23 becomes progressively closer to the enclosure 23 as the enclosure moves in an upward direction. A suitable plunger 119 is in slidable contact with the ramp device 118 so that as the enclosure 23 moves upward, the plunger 119 will move a suitable wiper arm of a potentiometer 120 contained within the enclosure 23.

Now referring to FIGURE 5, the potentiometer 120 has a B+ voltage from DC power supply 73 applied across the resistance portion thereof. The wiper arm of potentiometer 120 is connected to a suitable current amplifier 121 which supplies an output current through an inhibit gate 122 to a capacitor 123. The output impedance of amplifier 121 is sufficiently high so that the output currently therefrom will be substantially constant for any given input voltage to current amplifier 121, i.e., any given position of the wiper arm of potentiometer 120. The capacitor 123 charges up at a rate proportional to the current from current amplifier 121. Thus, the voltage on capacitor 123 increases until reaching the threshold voltage of a suitable voltage comparator 124 at which time voltage comparator 124 generates an output signal. The reference voltage for voltage comparator 124 is derived through a pair of resistors 125 and 126 from the supply voltage B+.

The output signal from voltage comparator 124 energizes a gate 127 which is connected across the capacitor 123 through a suitable discharge resistor 128. The output signal from voltage comparator 124 also energizes another gate 129 which connects the center point between the two resistors 125 and 126 through a suitable low value resistor 130 to ground. The gate 129, by pulling a sufficient amount of current from B+ through the resistor 125, causes the reference voltage to voltage comparator 124 to drop to a low reference value. Therefore, the voltage on capacitor 123 which is discharging through resistor 128, must drop to the new low reference voltage before the output signal from voltage comparator 124 will drop to zero, thus de-energizing gates 127 and 129. When gate 129 is de-energized, the reference voltage to voltage comparator 124 is changed to its original high reference level. The capacitor 123, then, begins charging up again as in the manner previously discussed.

Thus, it can be seen that the time for capacitor 123 to discharge from the high reference level to the low reference level will always be substantially the same, and thus the "on-time" of each pulse of the pulse train output from voltage comparator 124 will be the same. However, the time required for capacitor 123 to charge from the low reference level to the high reference level of voltage comparator 124 will be proportional to the current output from amplifier 121. Thus, the "off-time," and thus the frequency of the pulses from comparator 124, will be proportional to this current and therefore proportional to the relative longitudinal position of the cutting wheels 19.

It would be desirable to monitor an operating characteristic of the cutting wheels motor 32 to determine when the motor is overloaded and ready to stall out. In this connection a suitable disc 32a is placed on the shaft of the motor 32 to monitor the speed of the motor 32. This disc 32a has two portions 131 and 132 thereof made of magnetic material. These magnetic portions are relatively small and diametrically opposite one another on the disc 32a. Located in magnetic proximity to the disc 32a is a suitable pick-up coil 133 which has a voltage induced therein whenever either one of the magnetic portions 131 or 132 pass the pick-up coil 32a due to the change in magnetic flux. The signals derived from the coil 133 are supplied to a suitable one-shot circuit 134, which has a fixed "on-time." The negative going output from one-shot 134 is supplied through a suitable differentiator 135 and diode 136 to a pulse generator 137, which could comprise another one-shot. The positive going output from one-shot 134 and the output from pulse generator 137 are supplied through a suitable OR gate 138 to the control input of inhibit gate 122.

In operation, each motor speed pulse from pick-up coil 133 is delayed by delay one-shot 134 for a given time interval before being transmitted to the surface of the earth. This time interval is the on-time of one-shot 134. After the negative pulse output from one-shot 134 is differentiated by differentiating circuit 135 and rectified by diode 136, a positive pulse, which time-wise corresponds to the trailing edge of the pulse output from one-shot 134, triggers the pulse generator 137 to generate a pulse for transmission to the surface of the earth. The pulses from one-shot 134 and pulse generator 137, which are applied to inhibit gate 122, cause the capacitor 123 to stop charging up during the time interval which includes the "on-times" of both one-shot 134 and pulse generator 137. This inhibits any pulses from being generated from voltage comparator 124 while the cutting wheels motor speed pulses are being generated. However, the capacitor 123 is not discharged during this time, and after inhibit gate 122 is de-energized, the capacitor 123 continues to charge up as in the previously discussed manner.

To couple these pulses onto the cable conductors *e* and *f* for transmission to the surface, the output pulses from voltage comparator 124 to pulse generator 137 energize a pair of gates 139 and 140 respectively which are connected in push-pull fashion to the primary winding 78 of transformer 76. The center tap of primary winding 78 is connected to the supply voltage B+. In this manner, pulses of opposite polarity will be induced into the secondary windings 74 and 75 depending on which gate 139 or 140 is energized.

Now referring to FIGURES 7a–7f, there are shown the voltage wave forms of these pulse generating circuits for a better understanding thereof. Looking at FIGURE 7a, there is shown the voltage on the capacitor 123 of FIGURE 5. At the left-hand side of the figure, there is shown the voltage charging up to the high level reference voltage of voltage comparator 124. When the voltage on capacitor 123 equals this reference voltage, gate circuits 127 and 129 are energized to cause the capacitor to start discharging, as shown in FIGURE 7a, and the reference voltage of voltage comparator 124 to drop to the low reference voltage level. Looking at FIGURE 7b, there is shown the resulting cutting wheels position pulse (shown as negative) generated from voltage comparator 124. It can be seen, by comparing the time scales on FIGURES 7a and 7b, that the pulse width of the cutting wheels position pulse is equal to the time for capacitor 123 to discharge from the high reference voltage to the low reference voltage.

Now looking at FIGURE 7c, there is shown a typical wave form of this cutting wheels position pulse at the surface of the earth. The change in shape is due to such things as cable capacitance. It can be seen that there is a large positive overshoot whose time duration is considerable. Now referring to FIGURE 7d, there is shown the cutting wheels motor speed pick-up signal induced in pick-up coil 133. As stated in connection with FIGURE 5, this pick-up pulse causes a blank out pulse to be applied to inhibit gate 122 of the cutting wheels position pulse generating circuit, shown in FIGURE 7e. Referring to FIGURE 7f, there is shown the cutting wheels motor speed pulse which is supplied to the cable. It can be seen that the cutting wheels motor speed pulse of FIGURE 7f will be generated at a time when there is very little, if any, of the positive overshoot portion of the cutting wheels position pulse on the cable.

The positions of the cutting wheels position pulse and cutting wheels motor speed pick-up pulses of FIGURES 7b and 7d represent the worst case to be encountered, i.e. when they occur almost simultaneously. It can be seen that if the cutting wheels motor speed pick-up pulse of FIGURE 7d occurs at a later time than shown, the cutting wheels motor speed pulse of FIGURE 7f will be even further removed from the overshoot portion of the cutting wheels position pulse on the cable at the surface of the earth (see FIGURE 7c).

If the cutting wheels position pulse should occur at a later time with respect to the cutting wheels motor speed pick-up pulse of FIGURE 7d than as shown in FIGURE 7b, then the blank out pulse applied to inhibit gate 122 will inhibit the cutting wheels position pulse from being generated. Looking at the right half of FIGURES 7a through 7f, which represents a later time, it can be seen that the cutting wheels motor speed pick-up pulse of FIGURE 7d occurs before the cutting wheels pulse has been generated. Looking at FIGURE 7a, the voltage on capacitor 123 which has been charging up towards the high reference voltage is held at a constant voltage once the blank out pulse of FIGURE 7e to inhibit gate 122 has been generated. This voltage is maintained on capacitor 123, as shown in FIGURE 7a, until the blank out pulse of FIGURE 7e is removed from inhibit gate 122, at which time the voltage on capacitor 123 continues rising until it reaches the high level reference voltage and another cutting wheels position pulse is generated.

Thus, it can be seen that by using the apparatus of FIGURE 5 for generating the cutting wheels position and motor speed pulses, the cutting wheels motor speed pulses can be transmitted to the surface of the earth on the same conductor pair without hindrance from the cutting wheels position pulses, and yet the position pulses will not be materially affected since capacitor 123 is not discharged during the blank out period. If this were not the case, it can be seen that should the cutting wheels position and motor speed pulses being running at the same frequency, there is a chance that none of the position pulses would be transmitted. The danger is also present to a lesser degree if the frequency of the position pulses is a multiple of the frequency of the motor speed pulses.

Referring back to FIGURE 5, there is one more monitoring function present in the downhole apparatus. It would be desirable to monitor the hydraulic pressure of the hydraulic anchor means since as discussed earlier, should the tool begin slipping, the cutting wheels may bind in the earth formations. To accomplish this monitoring function, a hydraulic pressure switch 141 is located at a suitable point in the hydraulic anchor means to monitor the pressure applied to the anchor member 17, which switch 141 closes upon the hydraulic pressure falling below a given specified level. (This switch is not shown in FIGURE 1 since hydraulic pressure switches are well known in the art.) One side of this switch 141 is tied to B+, the other side being connected through suitable current limiting resistor 142 to the input of inhibit gate 122. The value of resistor 142 is much less than the output impedance of current amplifier 121 and thus when the hydraulic switch 141 closes, a relatively large amount of current will be supplied to the capacitor 123. This large current will cause the capacitor 123 to charge up at a faster rate, thus increasing the frequency of the pulses applied from voltage comparator 124 to gate 139 to beyond the normal frequency of the positive indications. Thus, in reality, there are three sources of information coupled to cable conductors $e$ and $f$ via transformer 76, i.e. cutting wheels position, cutting wheels motor speed, and hydraulic anchor pressure.

Now, referring to FIGURE 6, the pulses transmitted up the cable on cable conductors $e$ and $f$ are supplied through the switches 59e and 59f which are in their normally closed position, thus coupling these pulses onto the secondary windings 143 and 144 of the transformer 58. The center point between the secondary windings 143 and 144 is connected to surface ground (the ground symbol designated S). The secondary windings 143 and 144 are phased such that the positive (motor speed) pulses are supplied in a positive polarity to a signal processing circuit 145, which is responsive to positive pulses and the negative (position) pulses are also supplied in a positive polarity to another signal processing circuit 146 identical in construction to circuit 145.

One problem that exists in detecting opposite polarity pulses transmitted to the surface of the earth over a conductor pair is that the previously discussed overshoots may trigger the opposite polarity pulse channel at the surface of the earth, thus giving an erroneous indication. One manner of solving this problem is to place suitable voltage discriminators in the pulse detection channels in the surface circuitry. However, the amplitude of the desired data pulses can vary due to such things as changing cable length as the tool is moved through the borehole and the harsh downhole environmental conditions, e.g., temperature. This would present the problem that some desired pulses may not be passed by the discriminator, or noise, such as the overshoots, would be passed as data pulses. The novel signal processing circuits 145 and 146 substantially alleviate this problem.

Now concerning these signal processing circuits 145 and 146, refer to the circuit 145. The positive pulses from secondary winding 144 charge up a capacitor 147 through a forward-biased diode 148 to the peak applied voltage. A suitable high impedance input amplifier 149, such as an emitter follower is responsive to this peak voltage to provide a DC signal to the resistance portion of a potentiometer 150, which DC signal is proportional to the peak value of the pulses induced in secondary winding 144. Thus, the circuitry comprising diode 148, capacitor 147, and emitter follower 149 comprises a peak detector, the capacitor 147 charging up quickly through diode 148 to the peak level, but discharging slowly so as to hold the charge thereon. The wiper arm of potentiometer 150 is set at a certain percentage of the peak voltage to provide a reference voltage to a voltage comparator 151. The pulses from secondary winding 144 are applied to the input of voltage comparator 151. The wiper arm of potentiometer 150 is set so that voltage comparator 151 will pass only the motor speed pulses from secondary winding 144 and block any other pulses such as the overshoot pulses. It has been found that a reference voltage of approximately two-thirds of the peak detected voltage will be sufficient.

Thus, it can be seen that the signal processing circuit 145 acts to vary the bias or reference voltage of the pulses passed by voltage comparator 151 in accordance with the variations in the peak voltage of the detected pulses. The output pulses from voltage comparator 151 could be shaped, if desired, including each pulse being given the same pulse width and amplitude, by a one-shot 152. If the pulses from comparator 151 are shaped properly, one-shot 152 could be omitted. The signal processing circuit 146 acts in the identical manner on the cutting wheels position and hydraulic anchor pressure pulses from secondary winding 143. If desired, only one peak detection circuit could be utilized to bias both channels, but separate circuits are felt to be desirable due to factors which may affect the opposite polarity pulses separately. It should be noted at this point that the blank out of the position pulses in the tool (energization of inhibit gate 122) will aid this automatic bias control operation. That is to say, the occurrence of a motor speed pulse while the overshoot from the cutting wheels position pulse is still present might tend to push the peak voltage on capacitor 147 too high. Since the discharge rate from capacitor 147 is slow, this may tend to cause errors. However, because of the downhole blanking operation, this problem does not exist as concerns the motor speed pulses.

The output pulses from one-shot 152 of signal processing circuit 145 are supplied to a pulse rate to DC converter 153, the design thereof which is well known in the art. In like fashion, the detected cutting wheels position pulses are applied to a pulse rate to DC converter 154. The DC output voltage from pulse rate to DC converter 154, which is proportional to the frequency of the cutting wheels position pulses received at the surface of the earth, are applied to a suitable voltmeter 155 and a voltage comparator 156, which could also be a Schmitt trigger, if desired. The reference voltage comparator 156 is derived from the wiper arm of a suitable potentiometer 157 to which is supplied a constant voltage V. The reference voltage applied to voltage comparator 156 is set such that an output signal will be generated from voltage comparator 156 when the high frequency pulses indicating low hydraulic anchor pressure are received, i.e., the higher frequency will cause the DC output from pulse rate to DC converter 154 to increase substantially.

When the low hydraulic pressure signal indication is received, it becomes necessary to increase the hydraulic anchor pressure. However, since a fastener response time than is obtainable with human operators may be required, this function is performed automatically by applying the output signal from voltage comparator 156 to the "increase anchor pressure" function, which causes a low positive current to be supplied to the relay solenoids K1–K4 (FIGURE 5) to increase the hydraulic anchor pressure downhole.

Looking at the motor speed channel, the output from pulse rate to DC converter 153 is supplied to the negative input of a differential amplifier 158. A suitable frequency to DC converter 158a is responsive to the frequency of the power supplied to the cutting wheels motor 32 from AC source 99 to generate a DC reference signal proportional to this frequency to the positive input of differential amplifier 158. Differential amplifier 158 supplies a signal representative of the difference between these two input signals to another voltage comparator 159, which could be a Schmitt trigger, for example. The comparator 159 derives its reference voltage from the wiper arms of a potentiometer 160 to which is applied the constant voltage V. When the DC output voltage from differential amplifier 158 exceeds this reference voltage, voltage comparator 159 generates an output signal to the "feed cutting wheels down" function which causes the switches 110 to be opened thus providing zero current downhole. This causes the enclosure 23 (FIGURE 2) to be fed downward to allow the torque of the saw motor to build up again. (If an "increase anchor pressure" indication has been received, it takes precedence though.)

Before proceeding with the theory of operation of the apparatus of FIGURES 5 and 6, it would be desirable to first explain how the overload operating point or the stall out point of the cutting wheels motor 32 can be determined when the tool is on the end of a long cable in the borehole. One common way of determining the overload operating point or stall out point of a polyphase induction motor is to measure the "slip." The "slip" of a polyphase induction motor is considered to be the difference between the synchronous speed (frequency of the applied power) of the motor and the armature or output shaft speed of the motor, i.e., motor speed. If the resistance of the power distribution system is always constant (like from the power company), this determination of slip is a relatively straight forward operation. However, when as in this case, the motor is on the end of a long cable in the borehole, this determination of slip is not so easy due to the change in cable resistance. This change in resistance may be substantial since the tool may be thousands of feet in the borehole.

Referring now to FIGURE 8, there is shown a torque versus revolutions per second curve of a typical polyphase inductor motor. Curves are shown for no cable length, maximum cable length, and some intermediate cable length, such as 10,000 feet. The dotted line curves in FIGURE 8 show the effect of decreasing the voltage applied to the cable at the surface of the earth, at maximum cable length. The normal operating point is to the right of the peak of the particular curve. The peak of each of the curves in FIGURE 8 is normally considered to be the "critical slip point" or stall out point of the motor. That is to say, when the motor speed falls below the critical slip point for a given cable length, the motor is in the process of stalling out. It can be seen that this critical slip point is radically different for the different cable lengths. Thus, it can be seen that it would be very difficult if not impossible to determine the "critical slip point" of the tool when it is operating in the borehole by measuring this slip when the motor was at the surface of the earth. Knowing the cable length would not help very much either, since such things as temperature change, the operating conditions, and especially the resistance of the cable, which changes the voltage applied to the motor.

However, it has been found that if the voltage at the surface of the earth is decreased, the "critical slip point" will vary only slightly for any given cable length. This decrease in voltage is represented by the dotted line curves in FIGURE 8. Thus, by decreasing the voltage applied to the motor until it stalls out, the "critical slip point" can be determined when the tool is in the borehole.

Now referring to FIGURES 6 and 8 in conjunction, the method of determining the "critical slip point" or overload operating point of the saw motor is to first lower the tool to the point in the borehole at which it is desired to start the core slicing operation. The motor is started up and operated at a suitable point, as the operating point O on the maximum cable length curve of FIGURE 8. Next, the voltage of variable voltage AC source 99 is decreased, thus moving this operating point to the left in FIGURE 8, until the motor stalls out and the motor slip is noted. (The output signal from differential amplifier 158 is proportional to the synchronous speed (frequency of AC source 99) minus the motor speed and is thus a measure of "slip." Thus, slip is noted on a voltmeter 161 which is calibrated in slip, connected to the output of differential amplifier 158.)

The point at which the motor stalls out can be quickly determined since the meter needle will decrease slowly as the voltage applied to the cable conductors a-d from variable voltage AC source 99 is reduced. Then, when the motor stalls out, the needle will drop rapidly to zero. It is this point where the needle starts dropping rapidly to zero that is considered to be the "critical slip point." After providing a suitable safety factor, the reference voltage (wiper arm of potentiometer 160) to voltage comparator 159 is adjusted so that the cutting wheels will be fed down whenever the slip of motor 32 approaches this "critical slip point" or stall out point thus decreasing the load on the motor.

Now concerning the method of operation of the apparatus of FIGURES 5 and 6, the core slicing tool 10 is lowered into the borehole to a given depth level. The ganged switches 59 are switched to the normally open position to supply power to the DC power supply 67 downhole (FIGURE 5) so as to energize the depth control and directional information apparatus. After sufficient depth and directional information has been obtained (note—gamma ray and SP can be run separately), and when the tool is in the position desired to begin the core slicing operation, the ganged switches 59 are switched to the normally closed position thus energizing the DC power supply 73 (FIGURE 5) downhole and supplying power to cutting wheels motor 32.

Next, a low positive current is supplied to the relay solenoids K1–K4 downhole so as to increase the hydraulic anchor pressure (i.e. force hydraulic fluid into the proper chamber of the differential pressure piston arrangement) and therefore anchor the tool at a fixed point in the borehole. Next, a large negative current is supplied to. the relay solenoids K1–K4 downhole from the "start cutting wheels motor" function so as to switch the capacitor 104 into the motor 32 power circuit to facilitate starting. After the motor 32 has been started, the previously discussed method for determining the critical slip of the motor is carried out and the desired reference voltage to voltage comparator 159 set accordingly. The reference voltage applied to voltage comparator 156, to monitor the hydraulic anchor pressure, is presumed to already have been adjusted.

Now everything is ready for the core slicing operation. To start this operation, a small negative current is supplied to the relay solenoids K1–K4 downhole so as to cause the cutting wheels to be fed upward into the earth formations. The cutting wheels will usually cut through the earth formations in a continuous manner via the grooves shown in FIGURE 3 and return to the starting position in readiness for another slicing operation. The frequency of AC power supply 50 is adjusted to provide a continuous slice, i.e. the frequency determines the rate of feed. If, however, the formations are extremely variable, the core slicing operation will be a series of oscillating motions up and down within the formation interval until the entire core is sliced. In this case, the cutting wheels will be fed upwardly until voltage comparator 159 is triggered, at which time the cutting wheels will be fed in a downward direction until the slip reduces to a more desirable level, at which time the output signal from voltage comparator 159 will drop to zero. When this happens, the relay contacts 110 will be returned to their closed position and the cutting wheels will be again fed upward. This process will be repeated over and over again until the entire core is sliced.

If however during this process, a low hydraulic anchor pressure indication should be sensed by voltage comparator 156, the "increase anchor pressure" function will cause a low positive current to be supplied to the relay solenoids K1–K4 (regardless of the slip condition), thus causing hydraulic fluid to be pumped into the proper chamber of differential pressure piston arrangement until the pressure forcing the anchor member 17 (FIGURE 1) outward attains a desired value. During this automatic "increase anchor pressure" operation, the cutting wheels will no longer be fed upward, thus eliminating the possibility that the motor will stall out. This can be seen, in FIGURE 5, by noting the relay logic, wherein the relay contact K1a will switch to the normally open position to increase hydraulic anchor pressure thus removing power from the hydraulic cutting wheel feed motor 29a also.

While there have been described what are at present considered to be preferred embodiments of this invention, it will be obvious to those skilled in the art that various changes and modifications may be made therein without departing from the invention, and it is therefore, intended to cover all such changes and modifications as fall within the true spirit and scope of the invention.

What is claimed is:

1. Apparatus for transmitting information from a well tool in a borehole to the surface of the earth over a transmission medium, comprising:
    (a) a first information source for generating first information signals whose repetition rate is representative of said first information;
    (b) first means responsive to the first information signals for supplying transmission pulses of one polarity at said first information repetition rate over the transmission medium to the surface of the earth, each transmission pulse being generated a given delayed time interval after the generation of each first information signal;
    (c) a second information source for generating second information signal;
    (d) second means responsive to the second information signals for supplying pulses of the opposite polarity over the transmission medium to the surface of the earth; and
    (e) means coupled to the first means for inhibiting the transmission of the second information pulses during the time duration of at least the delay time interval so that the pulses from the second means will not interfere with the pulses from the first means.

2. Apparatus for transmitting information from a well tool in a borehole to the surface of the earth over a transmission medium, comprising:
    (a) a first information source for generating first information signals;
    (b) first means responsive to the first information signals for supplying pulses of one polarity representative of the first information over the transmission medium to the surface of the earth;
    (c) a second information source for generating second information signals;
    (d) means for generating a current which is substantially constant for any given information level of the second information source;
    (e) means responsive to the current amplitude for generating opposite polarity pulses having a parameter representative of the current amplitude;
    (f) means for coupling said opposite polarity pulses onto the transmission medium for transmission to the surface of the earth; and
    (g) means coupled to the first means for inhibiting the current representative of the second information signal from being supplied to the pulse generating means during selected times so that the pulses from the second means will not interfere with the pulses from the first means.

3. The apparatus of claim 2 wherein the first means includes means for delaying the pulses representative of the first information for a given time interval so that a voltage overshoot produced by the pulses representative of the second information will not interfere with the pulses representative of the first information; and the time interval for inhibiting the pulses from the second means comprises the given delay time interval plus the pulse width of the pulses representative of the first information.

4. Apparatus for transmitting information from a well tool in a borehole to the surface of the earth over a transmission medium, comprising:
    (a) a first information source for generating signals whose amplitudes are representative of said first information;
    (b) amplitude to frequency conversion means responsive to the first information signals for generating transmission signals whose repetition rate is representative of the first information;
    (c) means for coupling said transmission signals onto the transmission medium for transmission to the surface of the earth; and
    (d) a second information source for supplying a signal to said amplitude to frequency conversion means whenever said second information exceeds a given threshold level to thereby increase the repetition rate beyond the normal range corresponding to the first information alone, thus indicating that said second information has exceeded its threshold level.

5. The apparatus of claim 4 wherein the amplitude to frequency conversion means includes:
    (1) means for generating a current which is substantially constant for any given information level of the first information source;
    (2) pulse generating means responsive to the current amplitude for generating pulses whose frequency is representative of the current amplitude; and
    (3) means responsive to the second information signals for changing the current magnitude supplied to the pulse generating means so as to change the frequency of generated pulses to beyond the normal frequency range of the pulses corresponding to the first information.

6. Apparatus for controlling a core slicing tool in a borehole from the surface of the earth wherein the tool includes a motor driven cutting means, a motor driven hydraulic feed means, and a motor driven hydraulic anchor means, the apparatus comprising:
    means for supplying power to the cutting means motor, feed means motor, and anchor means motor;
    a plurality of switching means in the tool coupled to a transmission medium wherein different switching means are responsive to different current states on the transmission medium, said switching means comprising:
        first switching means responsive to a first current state for switching a reactive element into the cutting means motor power supply circuit for starting said cutting means motor;
        second switching means responsive to a second current state for supplying power to the feed means motor in a phase to cause the cutting means to be fed into a formation;
        third switching means responsive to a third current state for changing the phase of the power supplied to the feed means motor for reversing the feed of the cutting means;
        fourth switching means responsive to a fourth current state for supplying power to the anchor means motor to cause hydraulic pressure on the anchor means to be increased; and
        fifth switching means responsive to a fifth current state for changing the phase of the power supplied to the anchor means motor to cause hydraulic pressure on the anchor means to be decreased.

7. The apparatus of claim 6 wherein the power supplying means includes:
   a set of three conductors coupled between the tool and the surface of the earth;
   means located at the surface of the earth for supplying power to the tool in a first mode by providing a potential difference between a first two conductors of the conductor set;
   means for changing the mode of the power supplied over the second set of conductors to a second mode by providing a substantially equal potential on said two conductors of the conductor set, the current return being on the third conductor thereof;
   measuring means adapted for measuring given parameters representative of the position of the core slicing tool; and
   means coupled to the conductor set for supplying power to said measuring means in response to the first mode and supplying power to at least one of said motors in response to the second mode.

8. The apparatus of claim 7 and further including:
   means for generating a signal representative of a first information;
   means for coupling said information signal onto said first two conductors of the conductor set for transmission to the surface of the earth, said last-named means including a transformer having a primary winding for receiving said information signal and two oppositely phased secondary windings connected across said first two conductors whereby information signals will be coupled onto said first two conductors in series aiding relationship, yet the second power mode will not induce current into said primary winding.

9. Apparatus for monitoring the operation of a core slicing tool in a borehole and transmitting the monitored information to the surface of the earth over a transmission medium wherein the core slicing tool has a motor driven cutting means, the apparatus comprising:
   (a) means responsive to the rotational speed of the motor armature for generating first pulses whose frequency is representative of the rotation speed of the motor armature;
   (b) means responsive to the first pulses for generating a second pulse of a given time interval for each generated first pulse;
   (c) means responsive to the trailing edge of the second pulse for generating a third pulse of a given time interval;
   (d) a potentiometer device having a wiper arm whose position is representative of the relative position of the cutting means;
   (e) means responsive to the wiper arm position for generating fourth pulses whose frequency is proportional to the cutting means position;
   (f) means responsive to the second and third pulses for inhibiting the generation of the fourth pulses for the time interval of the second and third pulses; and
   (g) means for coupling the third and fourth pulses onto the transmission medium for providing information as to the motor speed and cutting means position at the surface of the earth.

10. The apparatus of claim 9 wherein the core slicing tool further includes hydraulic anchor means for anchoring the core slicing tool at a selected position in the borehole, the monitoring apparatus further comprising:
   (1) a switch adapted to close upon the hydraulic pressure of the anchor means falling below a prescribed level; and
   (2) means responsive to the closing of the switch means for changing the frequency of the fourth pulses beyond the normal frequency range of the pulse rate representative of the cutting means position.

11. A method of transmitting information from a well tool in a borehole to the surface of the earth over a transmission medium, comprising:
   generating a first signal whose repetition rate is representative of a first information parameter;
   generating first pulses of one polarity in response to said first information for application to the transmission medium to be transmitted to the surface of the earth, each pulse being generated a given time delay period after each first information signal is generated;
   supplying second pulses of the opposite polarity representative of a second information over the transmission medium to the surface of the earth; and
   inhibiting the supplying of the second pulses over the transmission medium during said time delay period and the time duration of each first pulse so that the second pulses will not interfere with the first pulses.

12. A method of transmitting information from a well tool in a borehole to the surface of the earth over a transmission medium, comprising:
   (a) generating first information signals whose amplitudes are representative of a first information;
   (b) converting said first information signals to a pulse train whose repetition rate is representative of said first information for transmission to the surface of the earth;
   (c) generating a second information signal upon a second information parameter exceeding a given threshold level; and
   (d) increasing said pulse repetition rate beyond the normal range corresponding to said first information in response to said second information signals so that the second information parameter exceeding its threshold level can be indicated at the surface of the earth.

13. A method of processing pulses transmitted from a well tool in a borehole to the surface of the earth, comprising:
   (a) receiving the pulses at the surface of the earth;
   (b) passing each pulse whose amplitude is above a given threshold level;
   (c) measuring the amplitude of the received pulses; and
   (d) adjusting the threshold level in response to a given percentage of the amplitude level of the received pulses.

14. Apparatus for selectively applying power from the surface of the earth to circuits in a tool in a borehole, comprising:
   (a) a set of three conductors coupled between the tool and the surface of the earth;
   (b) means located at the surface of the earth for supplying power to the tool in a first mode by providing a potential difference between a first two conductors of the conductor set;
   (c) means for changing the mode of the power supplied over the second set of conductors to a second mode by providing a substantially equal potential on said two conductors of the conductor set, the current return being on the third conductor thereof; and
   (d) means coupled to the conductor set for supplying power to a first circuit means in the tool in response to the first mode and supplying power to a second circuit means in the tool in response to the second mode.

15. The apparatus of claim 14 wherein the means for supplying power to the first and second circuit means in response to the first and second modes includes:
   (1) means at the tool coupled across the said two conductors for supplying power to the first circuit means only when a potential difference exists across said two conductors; and (2) transformer means at the tool having a primary winding coupled across said two conductors and the third conductor connected to the center tap of said primary winding, the secondary winding of said transformer being phased relative to the primary winding so that a voltage will be induced into the secondary winding only when said two conductors are at the same potential to provide said second mode.

16. The apparatus of claim 14 and further including:
means for generating a signal representative of a first information; and
means for coupling said information signal onto said first two conductors of the conductor set for transmission to the surface of the earth, said last-named means including a transformer having a primary winding for receiving said information signal and two oppositely phased secondary windings connected across said first two conductors whereby information signals will be coupled onto said first two conductors in series aiding relationship, yet the second power mode will not induce current into said primary winding.

17. The apparatus of claim 16 and further including:
means responsive to the first power mode for open circuiting the secondary windings during the first power mode so that current will not be induced into said primary winding during the first power mode.

18. The apparatus of claim 16 and further including:
means for generating second information signals representative of a second information for application to said primary winding; and
means responsive to the first information signals for inhibiting the transmission of the second information signals during selected times so that the second information signals will not interfere with the transmission of the first information signals.

19. Apparatus for processing pulses transmitted from a well tool in a borehole to the surface of the earth, comprising:
(a) means for receiving the pulses at the surface of the earth;
(b) voltage discriminator means for passing each pulse whose amplitude is above a given threshold level;
(c) means for measuring the amplitude of the received pulses; and
(d) means for supplying a given amount of the measured amplitude of the received pulses to the voltage discriminator means to set the threshold level of the voltage discriminator means.

20. Apparatus for transmitting information from a tool in a borehole to the surface of the earth over a transmission medium, comprising:
an information source for generating an information signal;
means responsive to the information signal for generating a current whose amplitude is substantially constant for any given signal amplitude level;
charge storage means responsive to the substantially constant current for building up a voltage as a function of time;
means for generating a reference voltage having a given value;
voltage comparator means responsive to the time varying voltage and reference voltage for generating an output signal upon the time varying voltage attaining a given relationship with respect to the reference voltage;
means responsive to the output signal for changing the value of the reference voltage supplied to the voltage comparator means to a new value and discharging the charge storage means at a predetermined rate so that the output signal will be generated until the charge storage means has discharged to the new reference value; and
means for coupling the output signal from the voltage comparator means onto the transmission medium for transmission to the surface of the earth.

21. Apparatus for transmitting information from a well tool in a borehole to the surface of the earth over a transmission medium, comprising:
a first information source for generating first information signals whose repetition rate is representative of said first information;
first means responsive to the first information signals for supplying transmission pulses of one polarity at said first information repetition rate over the transmission medium to the surface of the earth, each transmission pulse being generated a given delayed time interval after the generation of each first information signal;
a second information source for generating second information signals whose amplitudes are representative of said second information;
amplitude to frequency conversion means responsive to the second information signals for generating opposite polarity transmission pulses having a repetition rate representative of said second information for application to the transmission medium;
a third information source for supplying a signal to said amplitude to frequency conversion means upon the third information exceeding a predetermined threshold level to thereby change the pulse train repetition rate beyond the normal rate corresponding to the second information; and
means coupled to the first means for inhibiting the transmission of said opposite polarity transmission pulses during the time duration of at least the delayed time interval so that said opposite polarity transmission pulses will not interfere with the pulses from the first means.

22. A method of transmitting information from a well tool in a borehole to the surface of the earth over a transmission medium, comprising:
(a) supplying first pulses of one polarity representative of a first information over the transmission medium to the surface of the earth;
(b) supplying second pulses of the opposite polarity representative of a second information over the transmission medium to the surface of the earth;
(c) inhibiting the supplying of the second pulses over the transmission medium during selected time intervals so that the second pulses will not interfere with the first pulses; and
(d) changing the frequency of one of the first or second pulses to a frequency beyond the normal frequency range of the pulses representative of the first or second information in response to a third information.

23. Apparatus for transmitting information from a well tool in a borehole to the surface of the earth over a transmission medium, comprising:
a first information source for generating first information signals whose repetition rate is representative of said first information;
means responsive to each first information signal for generating a delay pulse having a given time duration;
means responsive to the trailing edge of each delay pulse for generating a transmission pulse of one polarity for application to the transmission medium to be transmitted to the surface of the earth;
a second information source for generating second information signals;
second means responsive to the second information signals for supplying second information transmission pulses of the opposite polarity over the transmission medium to the surface of the earth; and means responsive to the delay pulse and the first information transmission pulse for inhibiting the transmission of the second information pulses during the time duration of the delay pulse and first information transmission pulse so that the second information transmission pulses will not interfere with the first information transmission pulses.

References Cited

UNITED STATES PATENTS

| | | |
|---|---|---|
| 2,412,575 | 12/1946 | Frosch. |
| 2,436,563 | 2/1948 | Frosch _____ 340—18 X |
| 3,186,223 | 6/1965 | Wilson _____ 340—18 X |
| 3,311,876 | 3/1967 | Lee _____ 340—18 |

OTHER REFERENCES

Moroff, Artificial Neurons—For Machines That Learn, in Electronic Industries, December 1963, pp. 52–56.

RODNEY D. BENNETT, *Primary Examiner.*

D. C. KAUFMAN, *Assistant Examiner.*

U.S. Cl. X.R.

77—32.1; 318—3; 332—9